(12) United States Patent
Elliott

(10) Patent No.: US 7,909,053 B2
(45) Date of Patent: Mar. 22, 2011

(54) DRAINING SYSTEM FOR VALVE ACTUATOR/VALVE STEM PROTECTOR ASSEMBLIES

(75) Inventor: Lynn H. Elliott, Houston, TX (US)

(73) Assignee: Emerson Process Management Valve Automation, Inc., St. Louis, MO (US)

( * ) Notice: Subject to any disclaimer, the term of this patent is extended or adjusted under 35 U.S.C. 154(b) by 514 days.

(21) Appl. No.: 11/982,797

(22) Filed: Nov. 5, 2007

(65) Prior Publication Data
US 2008/0128031 A1  Jun. 5, 2008

Related U.S. Application Data

(63) Continuation-in-part of application No. 11/335,364, filed on Jan. 19, 2006, now Pat. No. 7,353,835.

(60) Provisional application No. 60/650,398, filed on Feb. 4, 2005, provisional application No. 60/898,466, filed on Jan. 31, 2007.

(51) Int. Cl.
*F16K 24/00* (2006.01)
(52) U.S. Cl. .................... 137/15.11; 137/312
(58) Field of Classification Search .......... 137/312, 137/1, 15.11, 313
See application file for complete search history.

(56) References Cited

U.S. PATENT DOCUMENTS

| | | | |
|---|---|---|---|
| 4,043,353 A * | 8/1977 | Shirey | 137/204 |
| 4,429,591 A | 2/1984 | Zuch | |
| 4,863,101 A | 9/1989 | Pater et al. | |
| 5,503,180 A | 4/1996 | Nimberger | |
| 5,881,766 A * | 3/1999 | Schlesch et al. | 137/597 |
| 6,424,928 B1 | 7/2002 | Elliott et al. | |
| 6,577,985 B2 | 6/2003 | Scalf | |
| 6,615,156 B2 | 9/2003 | Elliott et al. | |

OTHER PUBLICATIONS

U.S. Appl. No. 11/335,364, filed Jan. 19, 2006, Elliott, Lynn H.
Elliott, Lynn H., EIM Controls Technical Reference Book, First Edition, Published in the United States, 1996.
Elliott, Lynn H., "EIM Controls Field Case Study (Phase 1 Report)", Published in the United States, Apr. 27, 2004.

* cited by examiner

*Primary Examiner* — Kevin L Lee
(74) *Attorney, Agent, or Firm* — Marshall, Gerstein & Borun LLP

(57) ABSTRACT

Condensation draining system and method for valve stem protectors comprising an actuator and a stem protector assembly structured in combination to provide a drain and an opening for draining condensation from inside the assembly to outside the combination.

13 Claims, 13 Drawing Sheets

US 7,909,053 B2

DRAINING SYSTEM FOR VALVE ACTUATOR/VALVE STEM PROTECTOR ASSEMBLIES

CROSS REFERENCE TO RELATED APPLICATIONS

This application relates to, claims priority to, and is a continuation-in-part of: (1) U.S. application Ser. No. 11/335,364, filed Jan. 19, 2006 now U.S. Pat. No. 7,353,835, claiming priority to provisional U.S. 60/650,398 filed Feb. 4, 2005 to which priority is also herein claimed; and (2) provisional U.S. No. 60/898,466, filed Jan. 31, 2007. The inventor of both provisionals, as well as of the US application, is Lynn H. Elliott. The above 60/898,466 provisional application and the 60/650,398 provisional application are hereby incorporated herein by reference in their entirety.

FIELD OF THE INVENTION

The invention lies in the field of valve stem protectors for valve actuator/valve stem junctions, and more particularly, lies in the field of valve actuator and valve stem protector assembly combinations that drain condensate from inside the combination to outside the combination.

BACKGROUND OF THE INVENTION

The above referenced provisional and regular US co-pending applications, discuss the importance of both (1) lubrication and (2) protection from corrosion for valve actuator/valve stem junctions. Lubrication and protection from corrosion are important for valve actuator/valve stem junctions that are associated with valves operated in the open environment.

The referenced "open environment" typically includes industrial plants, such as water treatment plants and waste water plants. Environmental conditions are harsh at such industrial plants. Valves are expected to operate reliably over long periods of time.

The need for proper lubrication of contact areas between a valve actuator and a valve stem is discussed in the above applications, as is the necessity to otherwise protect the valve stem/valve actuator contact areas from corrosion caused by ambient water. The instant application particularly addresses this second issue. The instant application is directed to the specific problem of protecting the valve actuator/valve stem contact area and top actuator bearings and seal from corrosion caused by the condensation that can collect within a valve stem protector housing.

Valve stem protectors typically comprise long cylindrical sleeves affixed to the top of valve actuators by any one of a number of means and covering protruding portions of a valve stem. The protectors shield the valve stem and actuator joint areas from ambient atmospheric and environmental conditions, such as rain and snow and dust. They attempt to inhibit rust and corrosion of the active joints between the valve stem and actuator.

A general need to lubricate the contact area between the valve actuator and the valve stem is accepted in the industry. However, in addition, the instant inventor has discovered that condensation formed on the inside of a protective stem housing can be a significant source of, and a contributing cause to, corrosion and contamination of the valve stem/valve actuator contact area. It is important to keep condensation out of the top of the electrical actuator, where there is a seal and bearings, and out of the gear box and seal area associated therewith. Thus, notwithstanding general lubrication procedures and the presence of a stem housing, minimizing the effect of this source of corrosion and contamination provides an effective compliment to proper lubrication for maintaining an effective valve actuation system over long periods of time in harsh environmental conditions.

The instant inventor installed, in certain New York City water treatment plants, test models of the instant novel stem protector systems, prototypes that provided for the drainage of condensation from within the protector housing. The test models are yet working as designed. Engineers at NYC-DEP have taken notice of the instant inventor's solution to the condensation problem. One New York City mechanical plant and design engineer, who had taken notice of the problem and the instant inventor's solution, added the following technical reasoning, from his perspective, as to the nature of the problem. E.g.:

"At Hunts Point some people were observing that new Limitorque/Rodney-Hunt units were having extensive water build-up while new Rotork/Craft units were not, and both were outside, so some reasoned that Rotork and Craft had some solution to this problem that Limitorque and Rodney Hunt failed to solve. I know Rodney-Hunt seemed puzzled when we discussed this, and as far as I know only EIM [instant inventor] has developed a true solution to the water problem, so how could Rotork and Craft stop the water?

"After looking at this location the other day I believe I learned why Rotork and Craft lucked-out. As far as I can see the Rotork and Craft units are installed under an extensive air pipe and support truss system, but all the Rodney-Hunt gates are in the open exposed to the sky, and exposure to the open sky is the key to this.

"If you park your car outside over night you might notice dew or frost on the car. If you examine this you should notice that the parts of the car that face trees or buildings do not have dew or frost, but the parts that face the sky do, unless you are in a foggy area where everything gets covered. The reason for only some parts getting the dew is heat exchange through thermal radiation. All objects directly exchange heat by infrared thermal radiation. Like all forms of heat transfer the net exchange is proportional to the temperature difference, so a car parked outside is almost the same temperature as a nearby building or tree; therefore there is almost no heat transferred between these objects, and the solid object is at air temperature, so the water does not condense on the object. On a 70F day the clear sky temperature will be about 40F, so there will be heat lost from the car or stem cover to the sky if they have a clear and wide angle view of the sky, so while the air inside the cover may be relatively warm and hold water, the air near the stem cover gets cooled and causes condensation to form inside the cover. Meanwhile the stem covers under the air pipes have only an obstructed view of the sky at best, and they will be insulated against radiative heat loss to the sky, and they may even get radiative heating from the hot air piping.

"By the way condensation will not form on the stem, because due to a greenhouse effect the infrared radiation does not pass through the stem cover which only allows visible light to pass through it, so the stem does not thermally see the sky. The stem only thermally sees the stem cover, and even though the stem cover is cool enough to form condensation, it is not cool enough to cool the stem.

"Getting back to the Limitorque/Rodney-Hunt water problem, I do not see any breather modifications that will stop the water buildup, because these units happen to be in an unlucky spot. I think the only thing that can be done is to implement an EIM like [instant invention] fix and drain the water away from the stem."

Such confirms the utility and novelty of the instant invention.

To the instant inventor's best knowledge, only cursory attention to date has been paid to the problem associated with condensation build up inside stem protector housings. To the extent that stem protector housings have been provided with a simple "breathing" opening in the past, the condensation problem was not solved. Furthermore, the simple "breathing" openings attracted unwanted pollution inside of the housing.

The instant inventor determined that what is needed is a draining (or wicking) system for the stem protector housing, which is more than a simple "breathing" opening. This draining (or wicking) process, from inside a protector housing to outside a protector housing, includes a condensation collection structure, directing condensation to an opening located in a lower portion of, as at the bottom of, the housing.

Such collection or drain structure could be defined by portions of the stem protection assembly and/or housing. It could be defined, at least in part, by portions of the valve actuator housing itself, either as existing in current valve actuator designs or as modified in future designs. (That is, actuator designs could be modified such that they cooperated with stem protector assemblies to help provide drainage for housing condensate.) Drains, collection structure and openings, could also be designed to retrofit existing stem protector housings.

SUMMARY OF THE INVENTION

The invention comprises a condensation draining system for valve stem protectors associated with valve actuators. The invention includes an actuator for actuating a commercial valve, (the valve having a stem,) and a protector assembly structured to mate with the actuator to provide a housing encompassing the valve stem. The actuator and assembly are structured in combination to provide at least one condensation collection structure to direct interior condensation to at least one opening in a lower portion of, or at the bottom of, the assembly combination. The collection structure, or drain and opening, substantially drain condensation from inside the assembly combination to outside the actuator assembly combination.

The instant stem protector assembly may be constructed integrally or in several parts, such as cap, cylinder, base. The valve actuator itself can be designed to cooperate with the stem protector assembly to perform draining functions.

In one embodiment the drain and opening system could be assisted by a wicking material.

The invention also includes a method for draining condensation from inside to outside a valve actuator/stem protector assembly combination. The method includes mating a stem protector assembly to a valve actuator and providing draining structure within the mated assembly combination for directing interior housing condensation to at least one opening of the assembly combination. Housing condensation is thereby drained from inside to outside the actuator assembly combination through the opening.

BRIEF DESCRIPTION OF THE DRAWINGS

A better understanding of the present invention can be obtained when the following detailed description of the preferred embodiments are considered in conjunction with the following drawings, in which.

The drawings are primarily illustrative. It would be understood that structure may have been simplified and details omitted in order to convey certain aspects of the invention. Scale may be sacrificed to clarity.

DESCRIPTION OF PREFERRED EMBODIMENTS

A draining stem protector assembly/valve actuator combination requires at least one opening for draining condensation from inside to outside the combination. In one preferred embodiment the opening can be provided at the bottom of a stem protector housing, such as a cylindrical sleeve, where the sleeve mates with a stem protector base or a fitting or valve actuator structure, all designed to provide draining in combination. Preferably this opening is provided between the stem protector housing and a fitting or base that attaches and mates the stem protector housing, directly or indirectly, to the valve actuator. Alternately, however, the opening could be provided by structure such as a wicking pad or wicking packing or wicking tubes, provided between a valve actuator (and/or a valve actuator fitting or base) and a stem protector housing. Alternately, again the opening could be provided between the valve actuator structure itself and the stem protector assembly. This latter alternative envisions a redesign of typical valve actuator structure in order to provide mating structure for a stem protector housing while at the same time providing a drain and an opening to direct and drain out condensation. And alternately again, the opening could be provided by at least one hole placed in lower portions of the stem protector housing itself, including by retrofit of existing stem protector housings. This hole (or holes) would be toward the bottom or at lower portions of the housing and would be coordinated with a drain structure to direct condensation draining.

A drain structure for directing condensation to at least one drain opening is preferably provided by an interaction of portions of the stem protector assembly, such as interaction of a housing with a base. However, of course, a whole stem protector assembly could be provided as an integral unit. E.g. a drain could be formed integral with portions of the assembly or could be attached to or within an assembly or could be incorporated into the structure of a valve actuator housing itself, and designed to coordinate with a condensation draining system and drainage opening.

Figure 1:
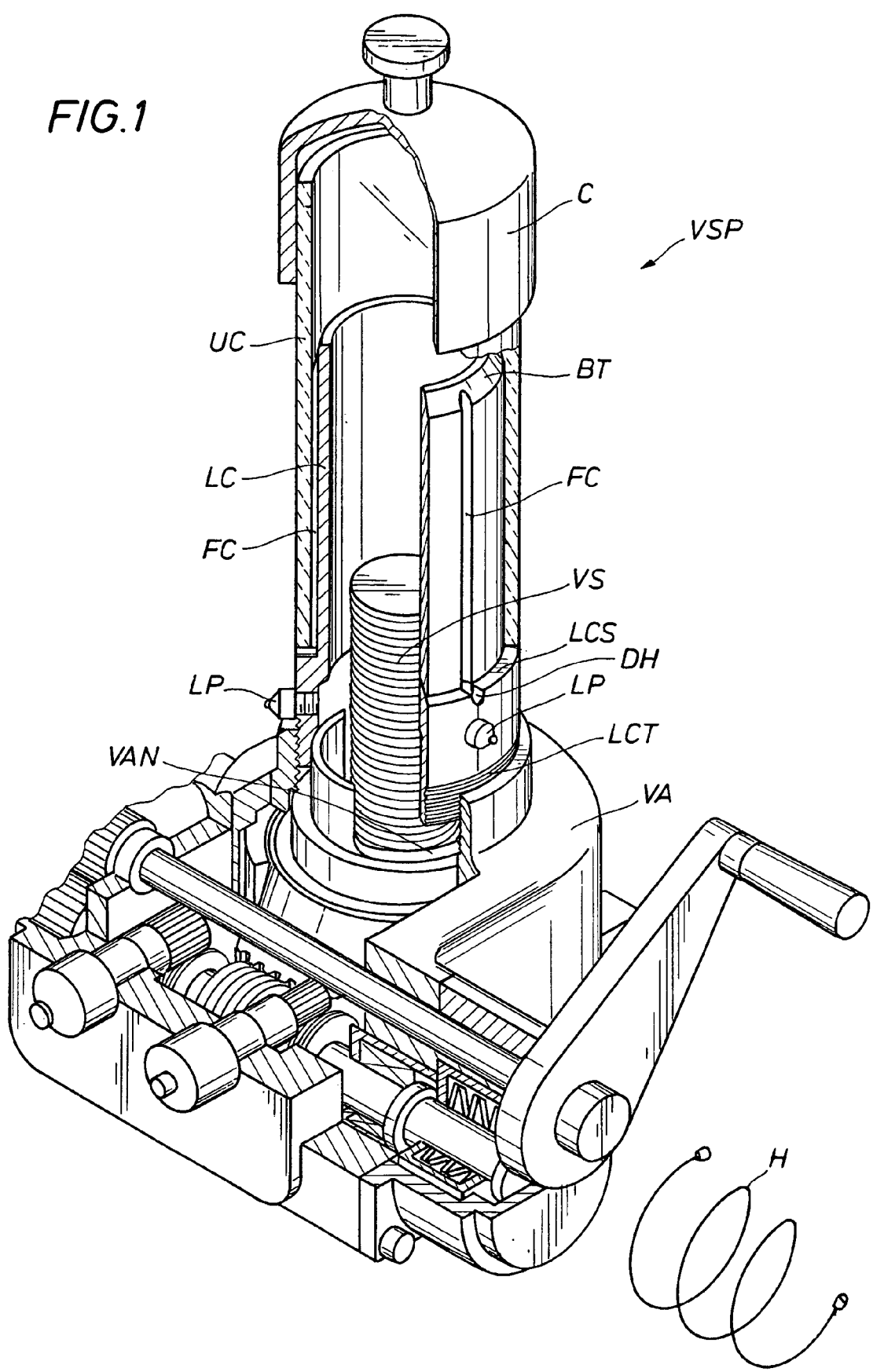
FIGS. 1A, 1B and 1C are included for background purposes and illustrate a typical integration of a valve actuator and stem protector assembly, including means for lubrication.
FIGS. 1D, 2 and 3 illustrate a preferred embodiment of the instant invention, providing for drainage of condensate from within a stem protector housing to outside of the stem protector assembly and valve actuator combination.
Figure 1A:
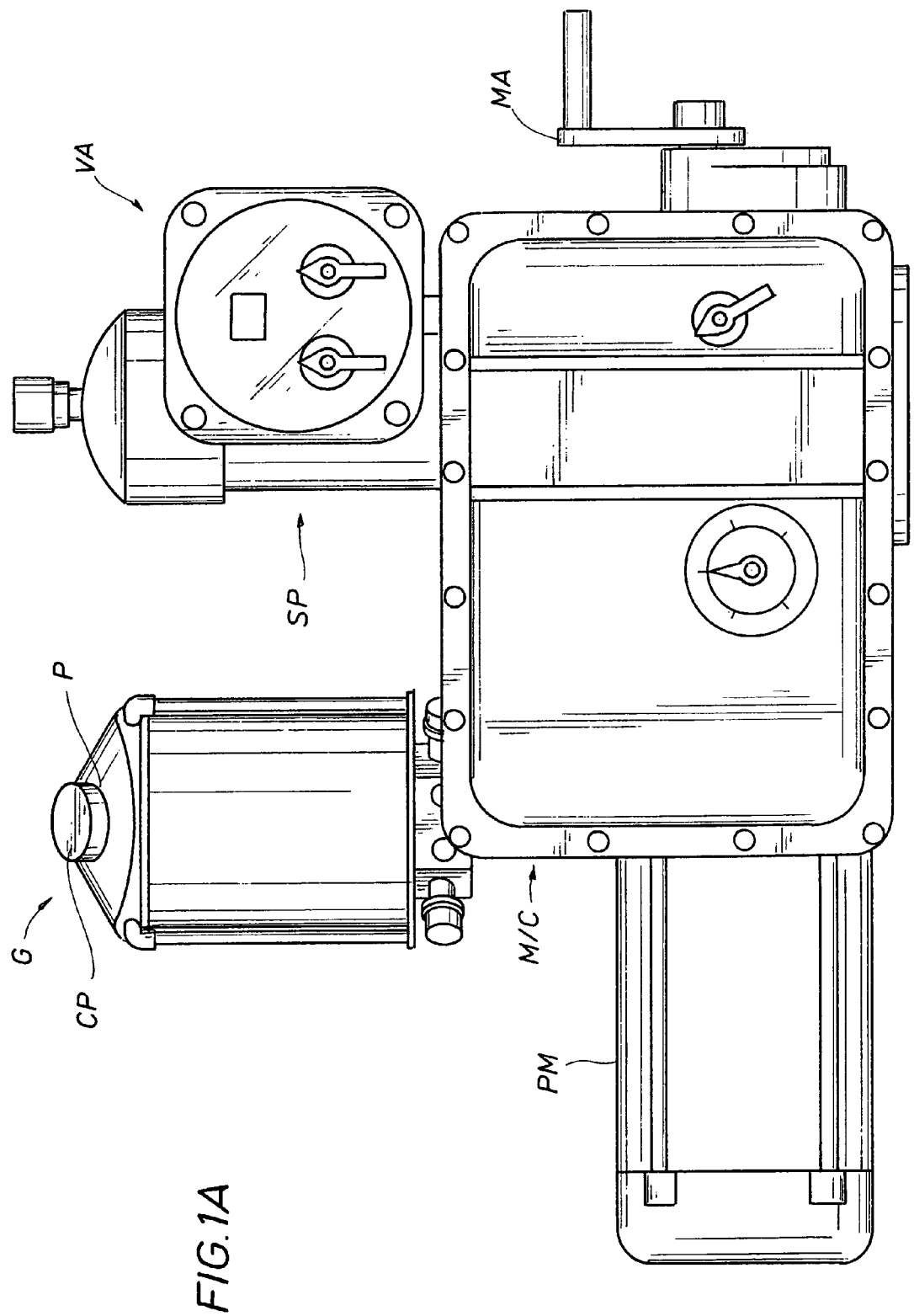
Figure 1B:
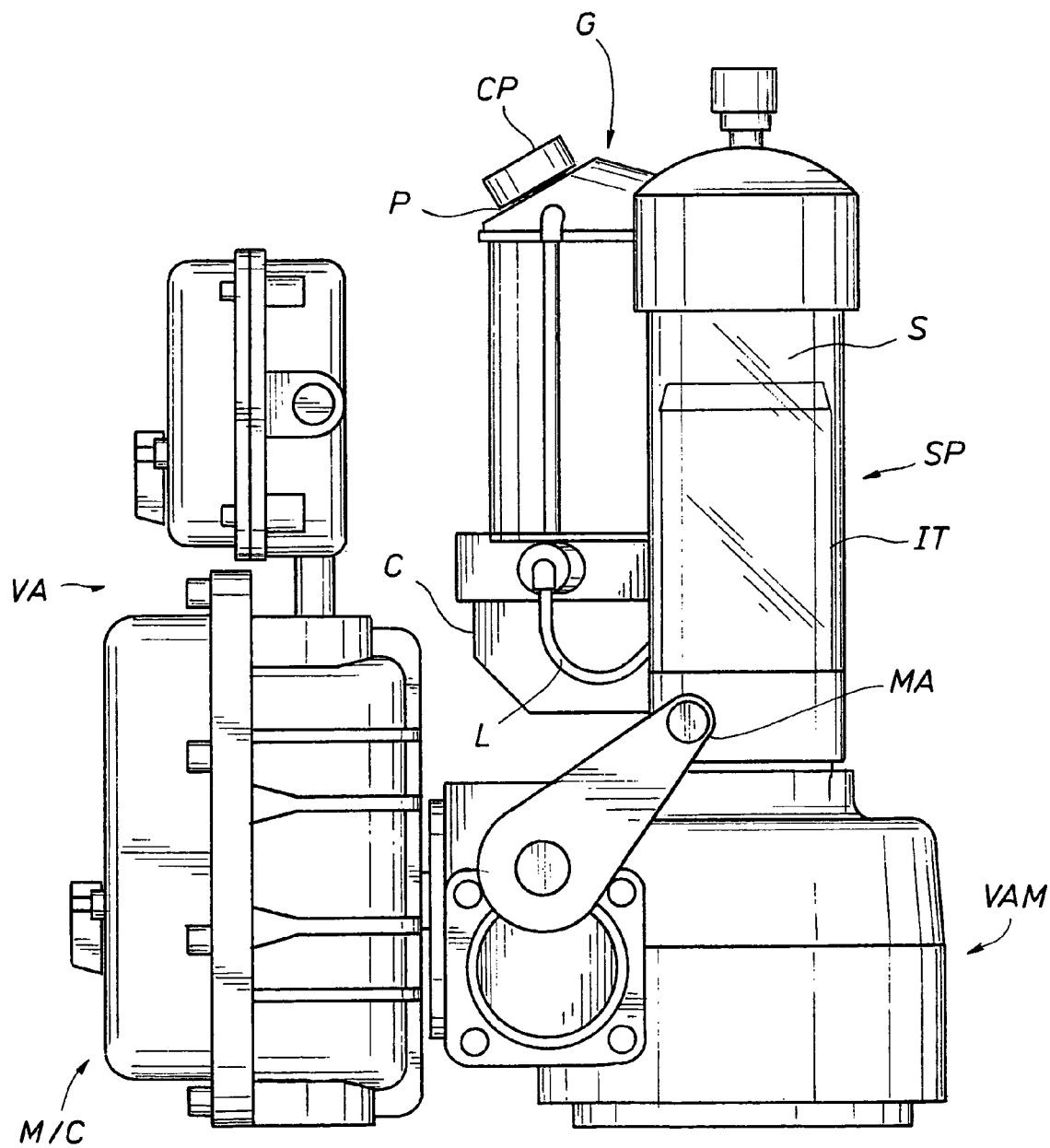
Figure 1C:
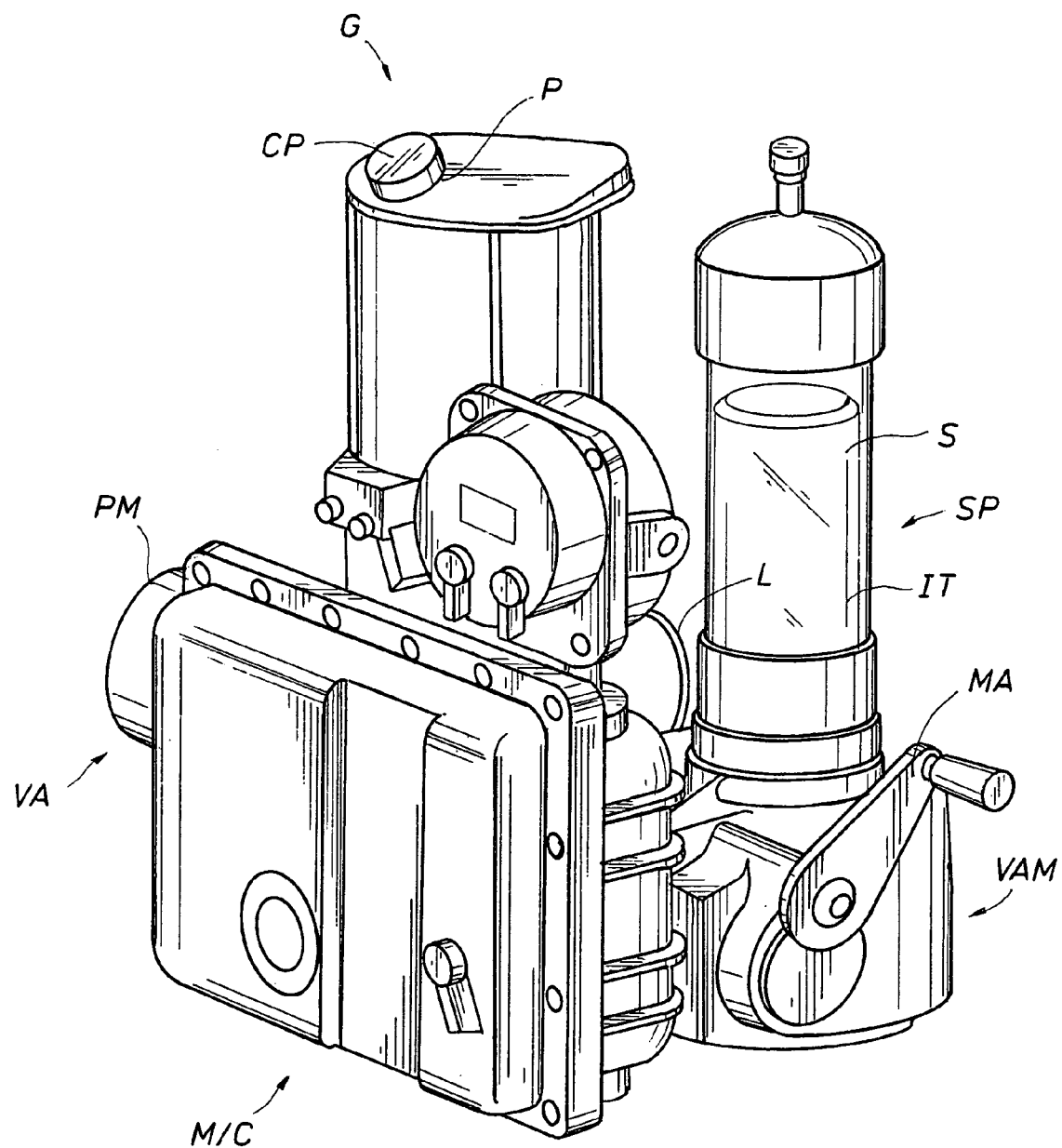

FIGS. 1A, 1B and 1C illustrate, for background purposes, an illustrative valve actuator VA having a stem protector SP for enclosing portions of a stem of a valve, (the valve and stem not being shown in the figures.) Although not directly pertinent to the instant invention, a lubrication system G is shown associated with the valve actuator stem protector. The lubrication system G has a lubrication chamber GC relatively closely associated with the valve actuator/stem protector junction and in fluid communication with valve stem surface area and/or the actuator nut and/or other areas of potential contact between the stem and valve actuator. A line L ports lubricant from a lubrication chamber into the stem protector chamber. A chamber of the lubrication system can be replenished with lubricant through an upper port P covered with a cap CP.

Figure 1D:
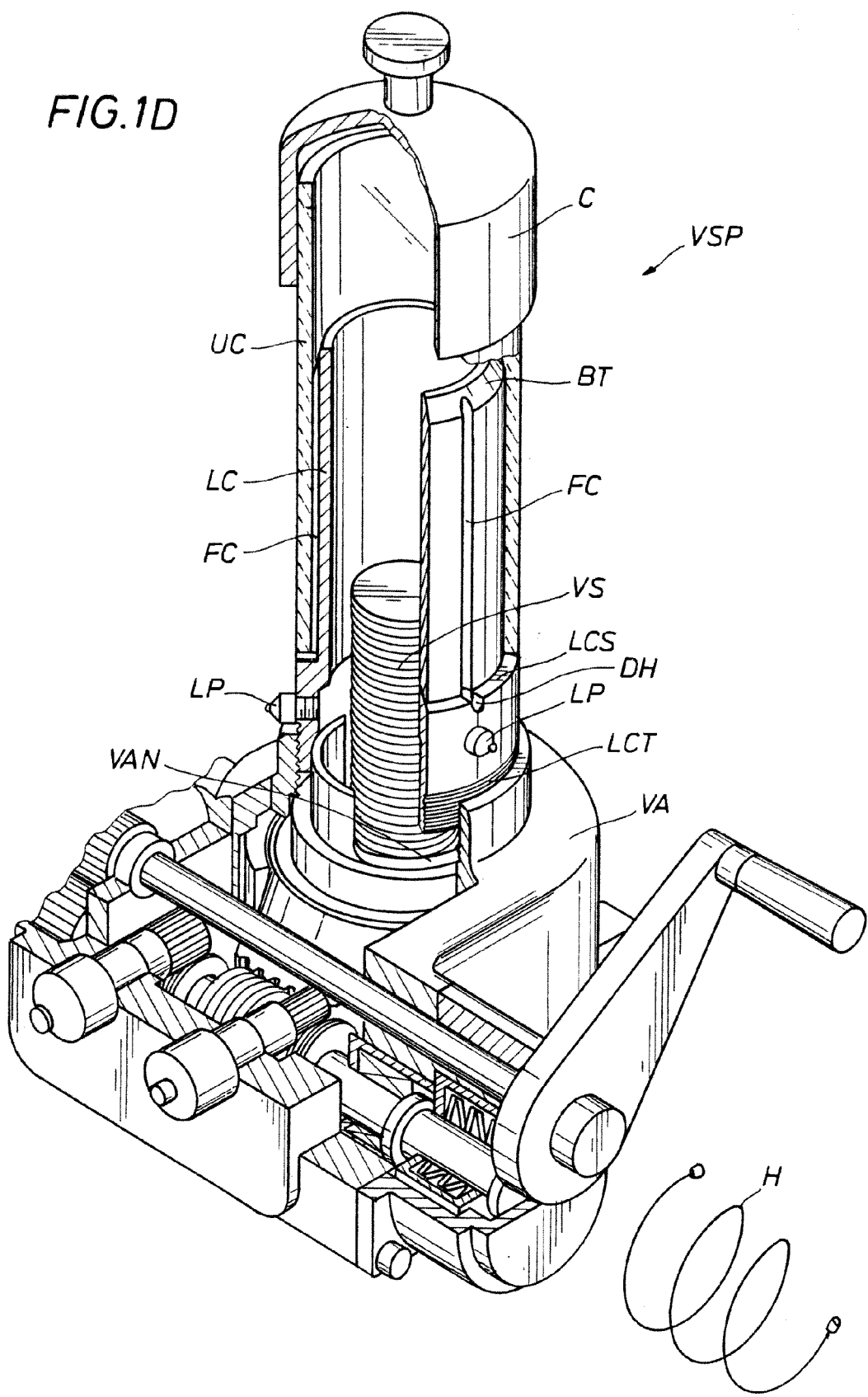
Figure 2:
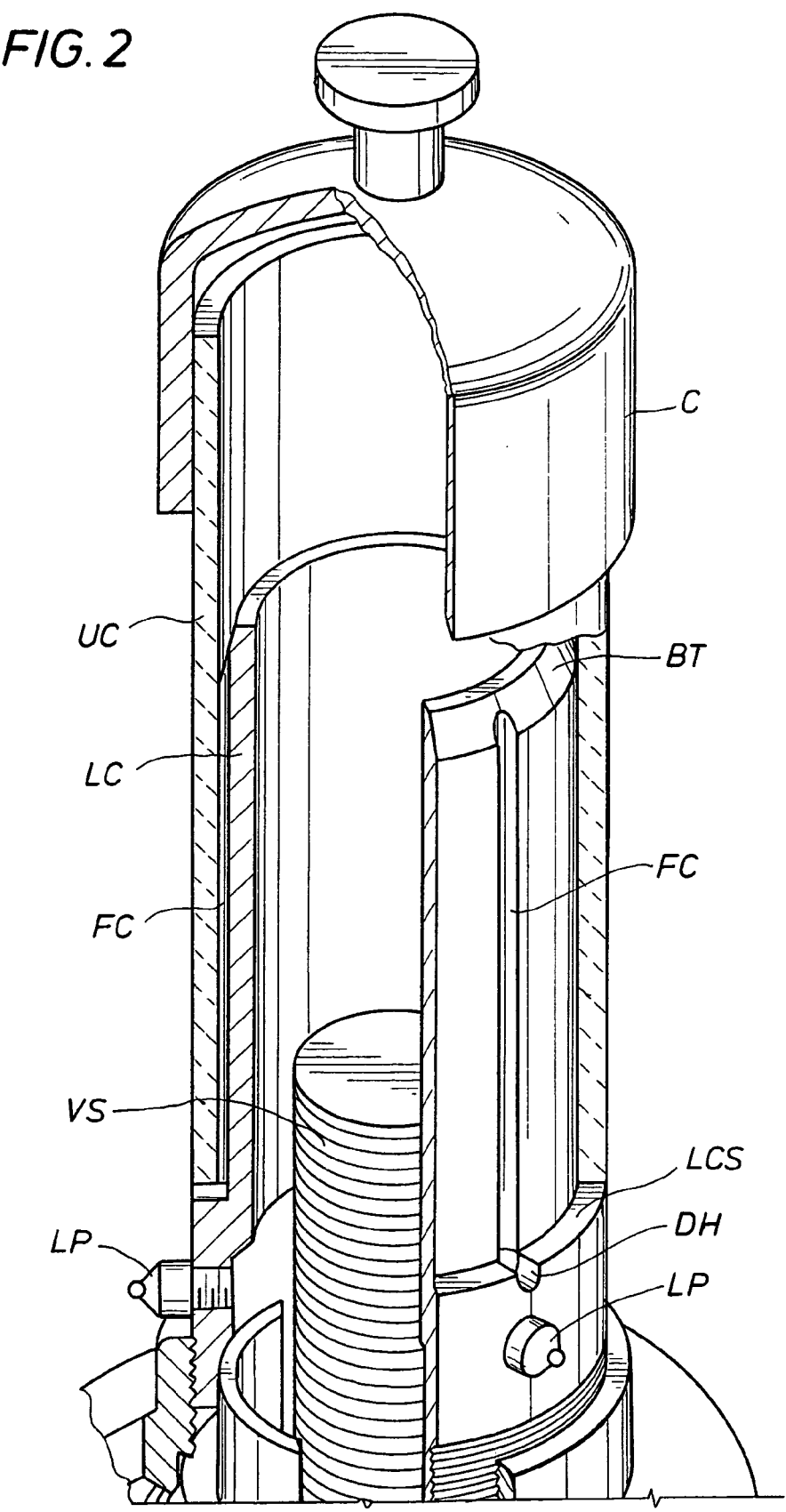
Figure 3:
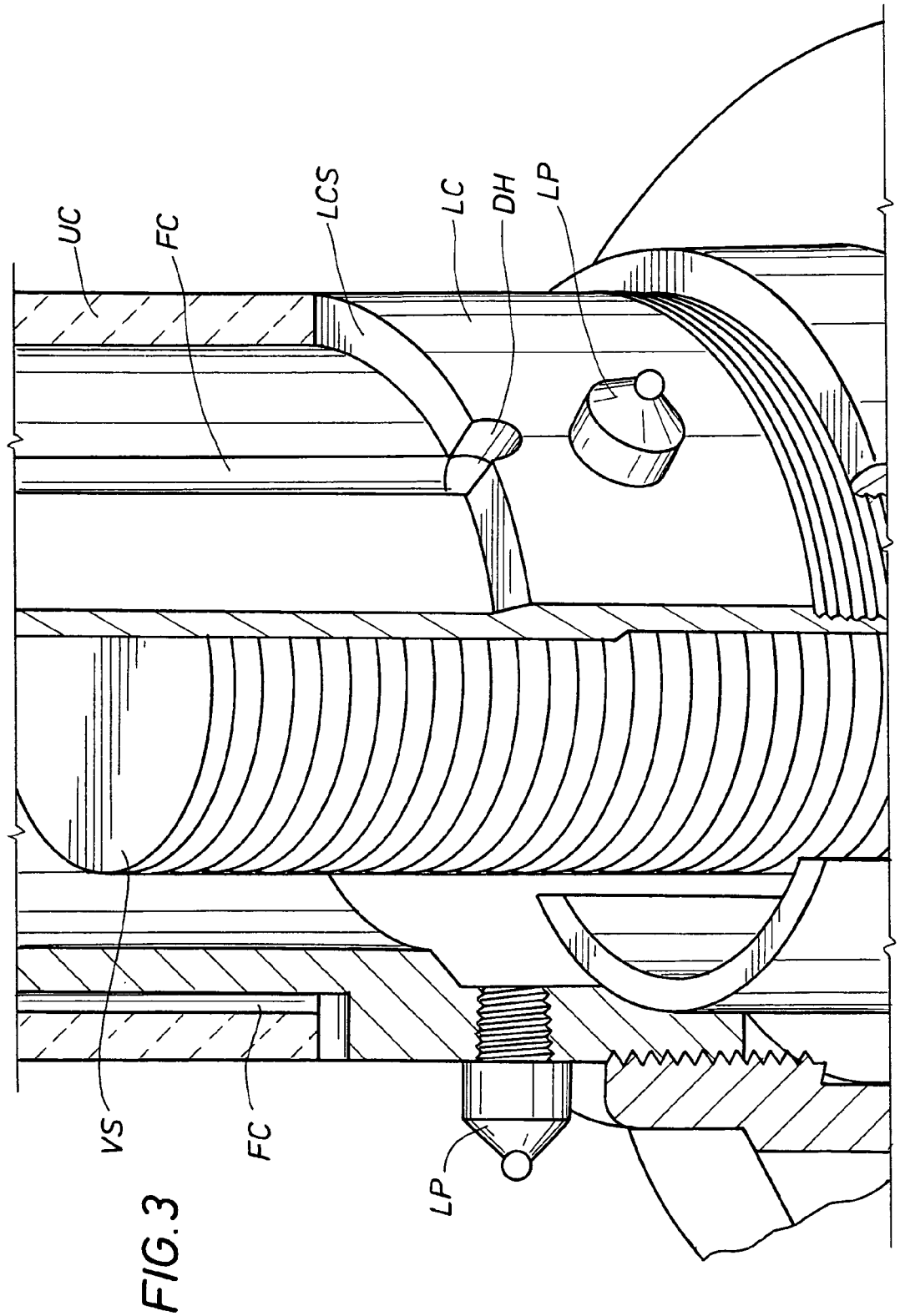

The embodiments of FIGS. 1D, 2 and 3 illustrate one embodiment of the instant invention having a draining space or port or channel FC for draining unwanted water or trapped fluid or condensation out of the valve stem/actuator interface area and away from locations sensitive to corrosion. A channel FC, between an inner sleeve LC and outer sleeve UC, both portions of a stem protector assembly, drains unwanted fluid away through drain hole DH. (Fresh lubricant, in fact, could be used to flush water that is collected in interface areas between the actuator and the valve stem into channel FC.)

To the extent unwanted fluid or water condenses on the inside of protector sleeve UC, the condensation can drain down the inside of protector sleeve UC into space or channel FC provided between upper sleeve UC and lower or inner sleeve LC and out an opening below channel FC. Space or channel FC provides for the fluid to drain to the bottom and then to the outside of the sleeve assembly through drainage hole DH. Beveled edge BT assists to direct the draining.

In preferred embodiments, as in the prior art, an outer or upper sleeve UC is comprised of a tough clear plastic cylinder capped at its upper in with a cap C. The outer cylinder preferably fits over a stem protector base, such as lower inner cylinder sleeve LC. Lower inner cylinder sleeve LC is typically formed from aluminum, cast iron or plastic. The inner sleeve can be threaded to fit into the internal threads provided by a valve actuator housing. Alternately, a separate universal fitting could be provided that mates between a standard valve stem protector housing, on the one hand, and a variety of valve actuator housings, on the other hand. Providing such a fitting may be cost effective.

Typically a stem protector base and/or fitting provides a shoulder on which an outer protective cylinder can rest. (Alternately, however, the outer valve protector assembly could rest on the valve actuator itself.) Typically also a stem protector base and/or fitting provides a press fit or the like for securing an outer stem protector housing against displacement by wind or storm or motion.

The outer cylinder can also be clamped to an inner cylinder or base or fitting. Again, channels with vertical components between a stem protector outer housing and stem protector base preferably provide for drainage of fluid down the stem protector assembly and out a drain hole, the hole either formed by an opening under the stem protector housing or through the stem protector housing or base itself. Suction or pressure could be applied to openings in the stem protector assembly to enhance drainage.

In the stem protector assembly of FIGS. 1D, 2 and 3 assembly VSP is attached to valve actuator VA. The assembly includes upper, outer cylinder UC and lower, inner cylinder LC. Preferably the lower cylinder LC is externally threaded in order to thread into the internal threads of a valve actuator VA. Lower cylinder LC contains two lubrication ports LP and a lower cylinder shoulder LCS upon which upper cylinder UC rests. Lower cylinder LC contains fluid channels FC comprising vertical grooves formed in its outside circumference. Alternately, channels FC can comprise slots extending between ridges formed on the outside circumference of lower cylinder LC. See FIG. 4B. Lower cylinder LC may contain a beveled top BT that encourages undesired fluid such as water condensation to drain down the vertical channels FC and out of drain hole DH associated with shoulder LCS and the bottom of the upper cylinder UC. The water drains to reach an outside portion of the valve stem protector VSP assembly. Beveled top BT helps guide water to the fluid channels FC.

Figure 4A:
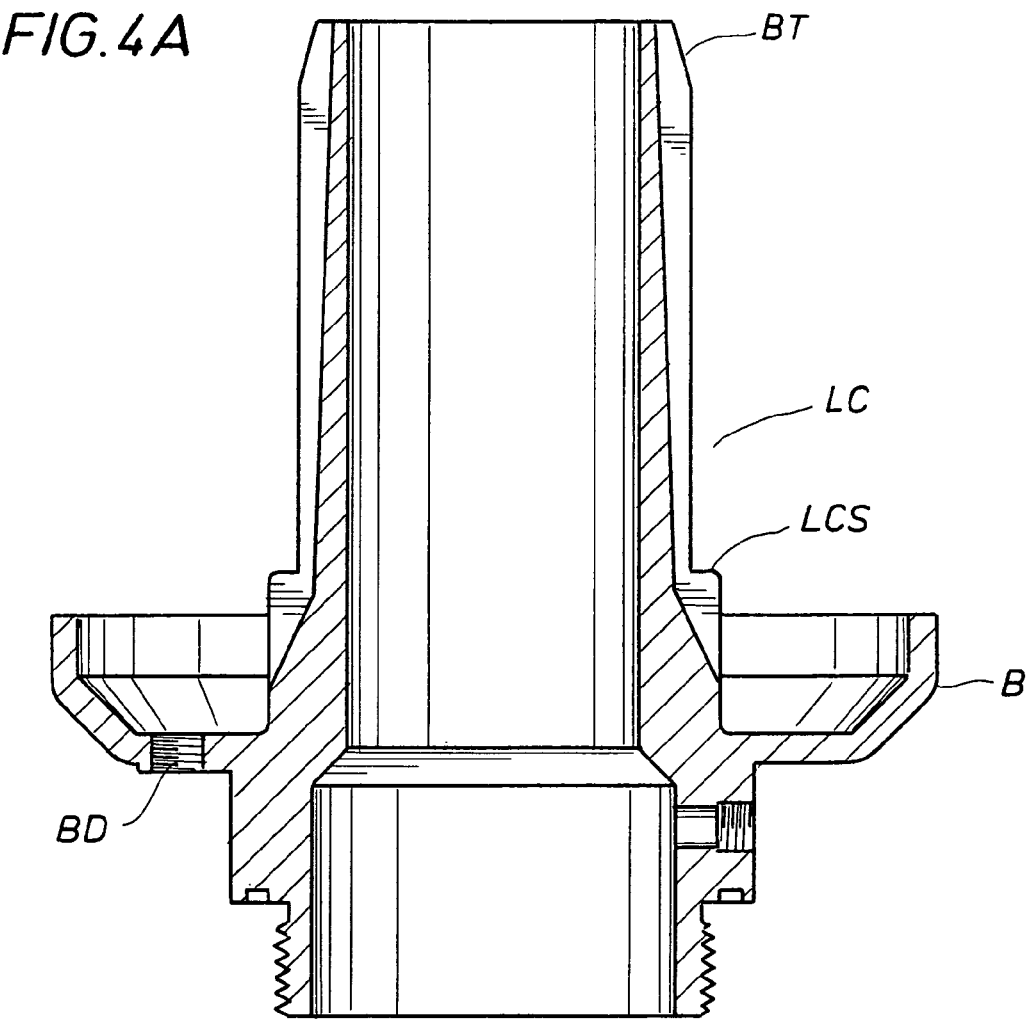
FIGS. 4A and 4B illustrate embodiments of a stem protector base that cooperate with a coordinate draining system.
Figures 3, 4B:
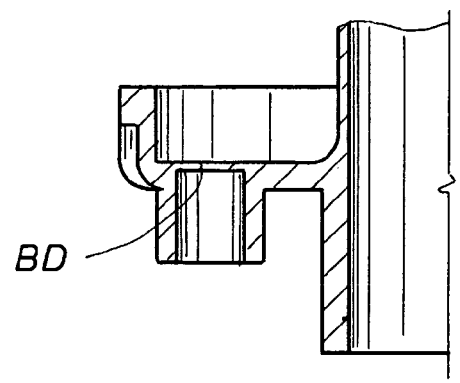
Figures 1, 4B:
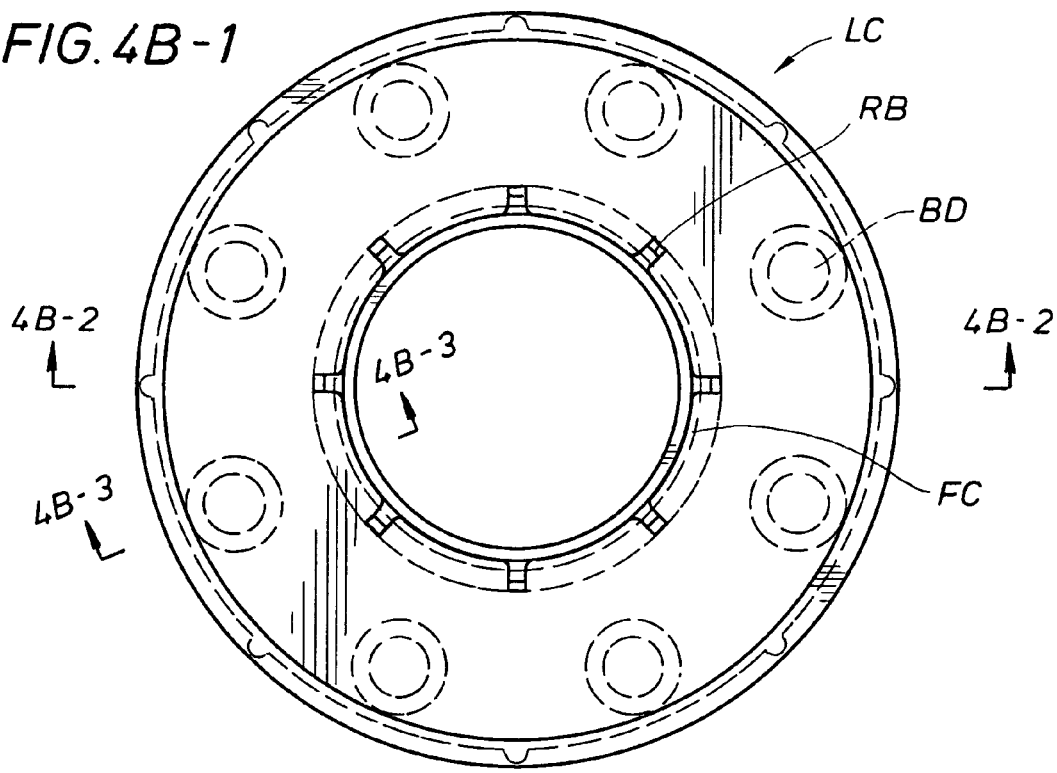
Figures 2, 4B:
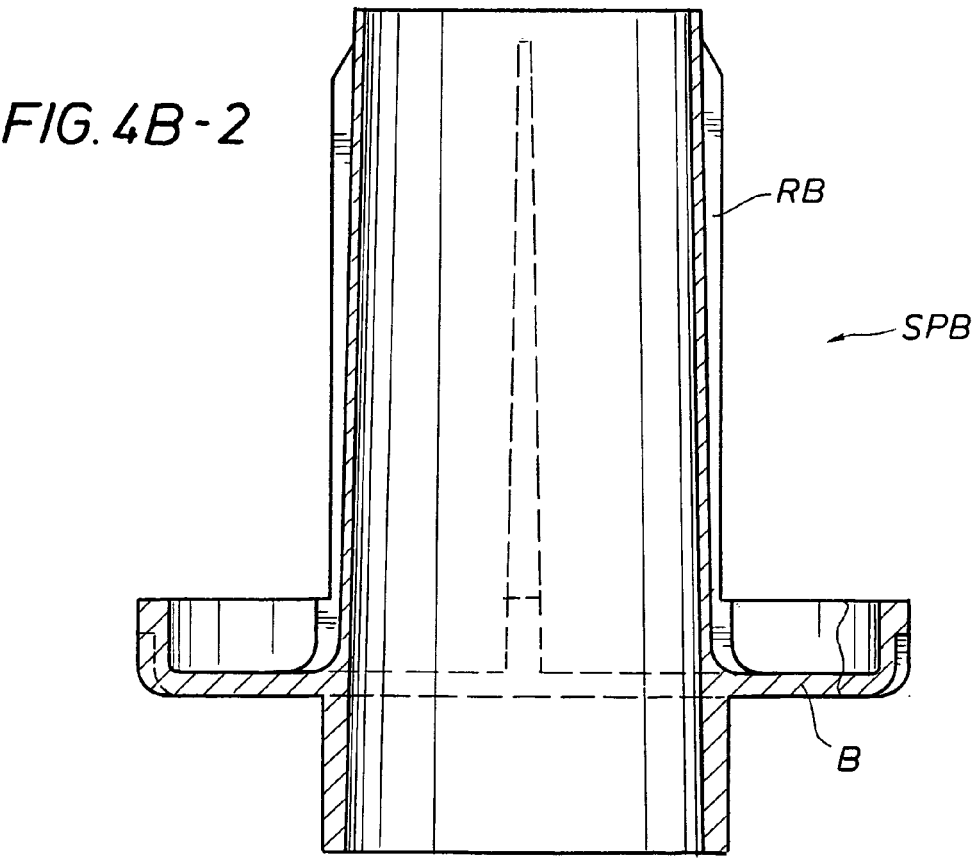

FIGS. 4A and 4B offer alternate embodiments for a stem protector base suitable for draining condensation. A primary difference between the embodiment of FIG. 4A and the embodiment of FIG. 4B is that in the embodiment FIG. 4A narrow fluid channels are constructed in the base of an inner or lower cylinder, much as in the above discussed embodiments of FIGS. 1D, 2 and 3. In the embodiment of FIG. 4B the outer or upper cylinder UC is press fit against lower cylinder or base B by virtue of a plurality of ribs RB on the base on lower cylinder. Rib structure RB creates larger fluid drainage channels or slots FC therebetween. Stem protector base SPB also provides a flanged bowl B for collecting water that is drained through fluid channels FC into a space below the outer or upper housing UC and the inner or lower housing LC. Provision is made around the bottom of bowl B for drilling an appropriate hole to drain the water that collects in bowl B in a specified direction which could be fortuitously directed away from other apparatus sensitive to the drainage of water.

The embodiment of FIGS. 4A and 4B of the stem protector base could be designed to screw directly into a valve actuator housing portion. Alternately, the stem protector base of FIGS. 4A and 4B could be designed to screw into a more universal fitting which itself in turn screwed into valve actuator housings. Providing a fitting that connects a universal stem protection assembly, or a small set of universally sized stem protection assemblies, to a variety of valve actuator housings can be cost effective.

Figure 4C:
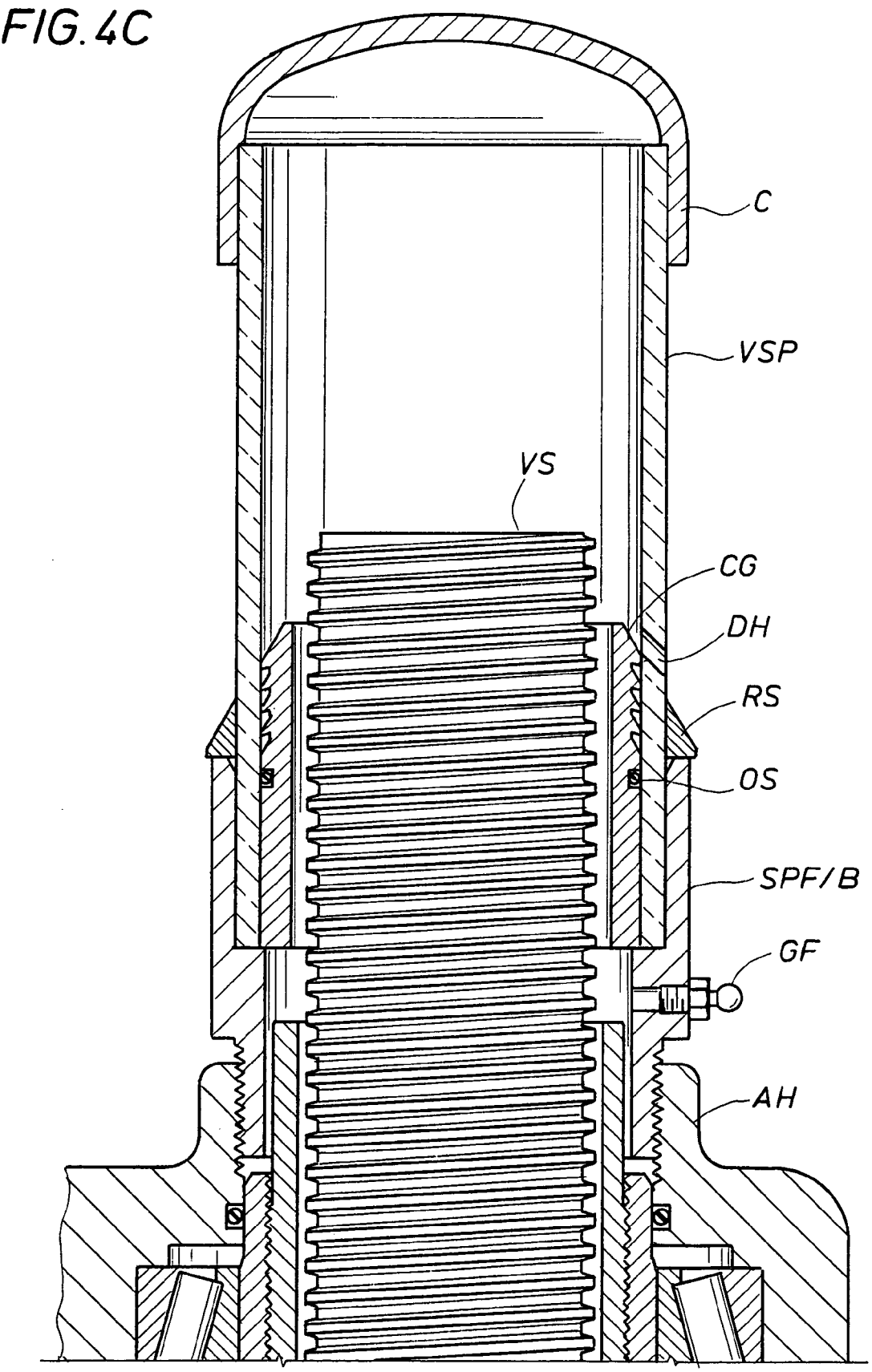
FIG. 4C illustrates a further embodiment of the instant invention, an embodiment particularly amenable to retrofit on existing stem protector assemblies.

The embodiment of FIG. 4C is more amenable to retrofitting existing stem protector assemblies. In the embodiment of FIG. 4C a valve stem protector cover VSP fits snuggly within a stem protector base SPF/B which in turn screws into actuator housing AH. Condensation guide or drain CG has been added to the inside of stem protector cover VSP. The condensation guide coordinates with the placement of drain holes DH through lower portions of stem protector cover VSP. Moisture condensing and running down the inside of stem protector cover VSP is directed by condensation guide CG to drain holes DH. The water drains out drain holes DH. Preferably a rain shield RS protects the top of the stem protector base SPF/B from the draining water. Also shown in the embodiment of FIG. 4C is an optional grease fitting GF and an O seal OS for sealing between condensation guide CG and the inside of stem protector VSP.

Figure 5A:
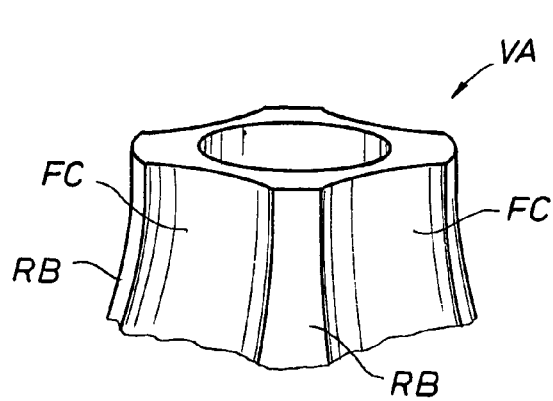
FIG. 5 illustrates portions or segments of stem protector assemblies according to the instant invention, illustrate how valve actuator design itself could (at least as modified) incorporate elements of a draining stem protector combination.

FIG. 5A illustrates how the housing of a valve actuator could be modified to provide "ribs" and "drainage slots" and "drain holes" itself. Ribs RB and drainage slots FC permit the valve actuator housing to perform the function of a stem protector base. A stem protector housing, such as in FIG. 5C, could be designed to securely fit over the ribs RB of the valve actuator housing.

Figure 5B:
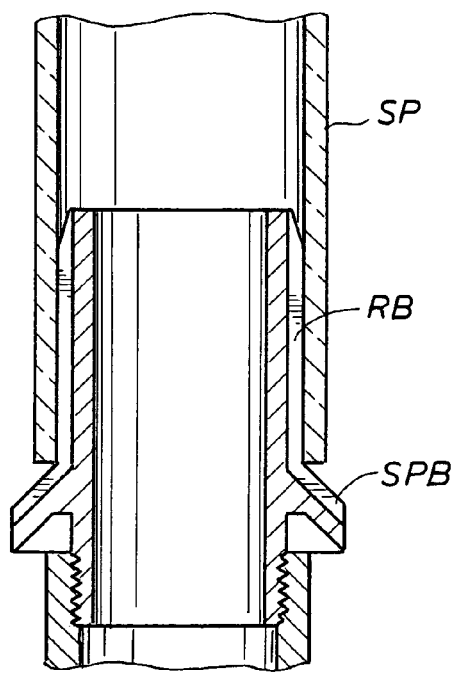
Figure 5D:
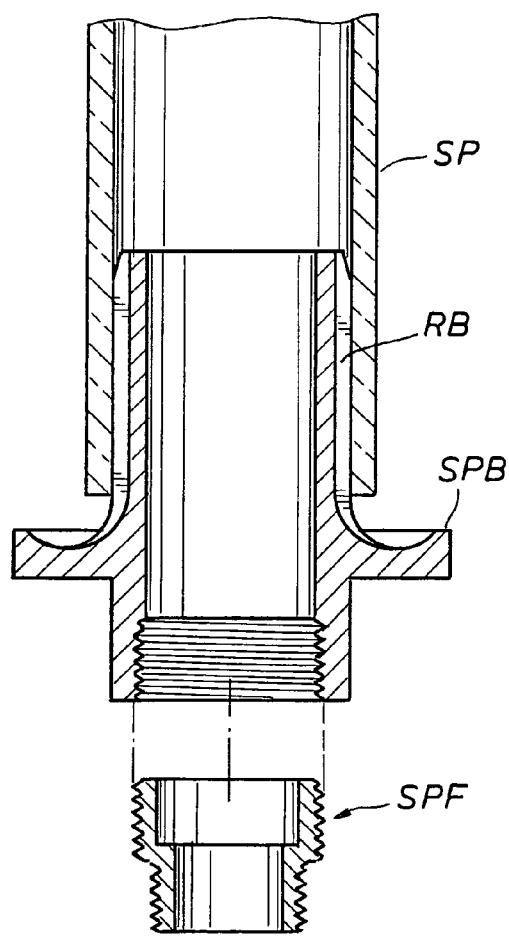
Figure 5C:
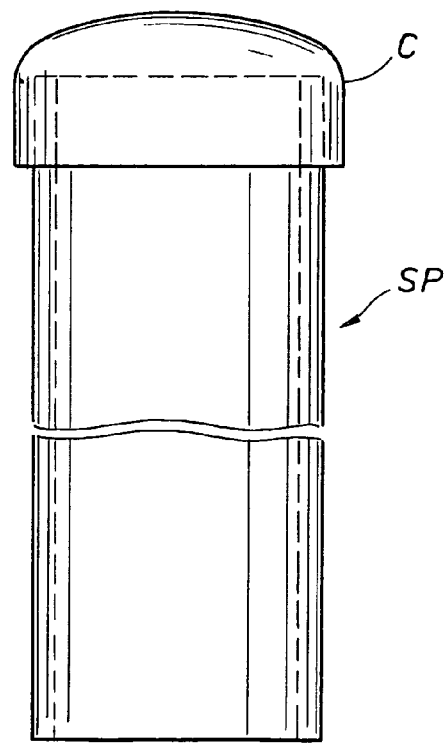
Figure 6A:
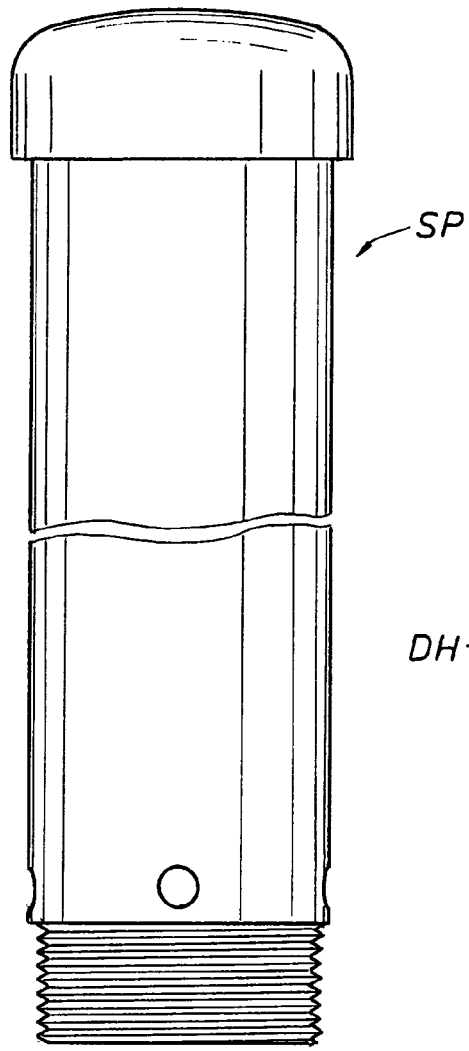
FIG. 6 illustrates alternate embodiments of elements of a draining stem protector assembly.
Figure 6B:
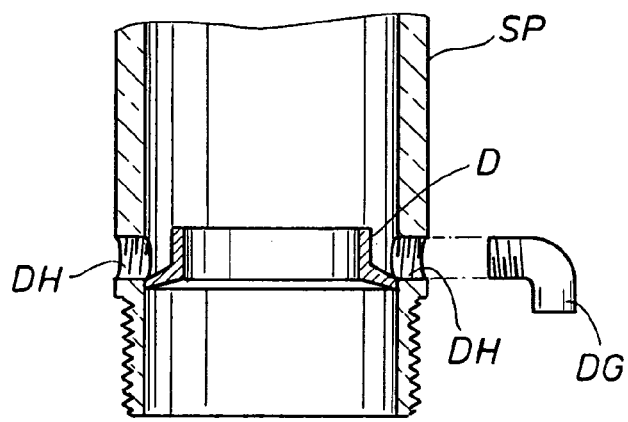
Figure 6C:
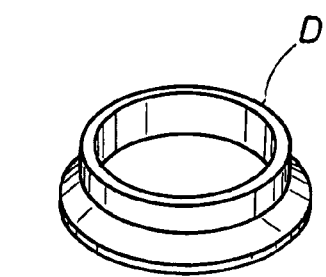
Figure 6D:
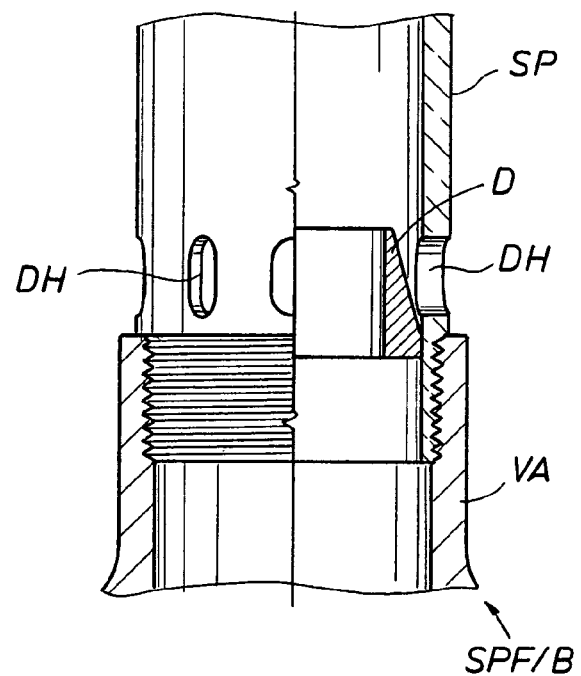
Figure 7A:
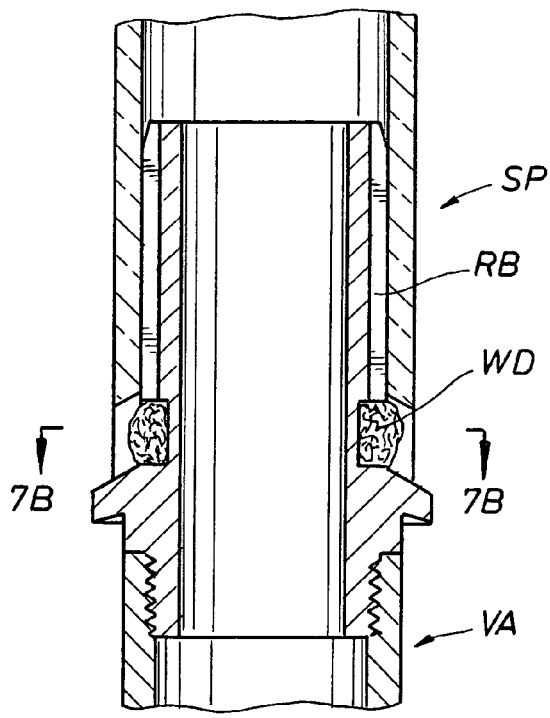
FIG. 7 illustrates wicking embodiments of the instant invention.
Figure 7B:
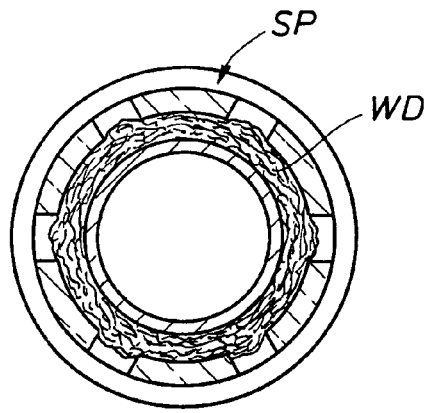
Figure 7C:
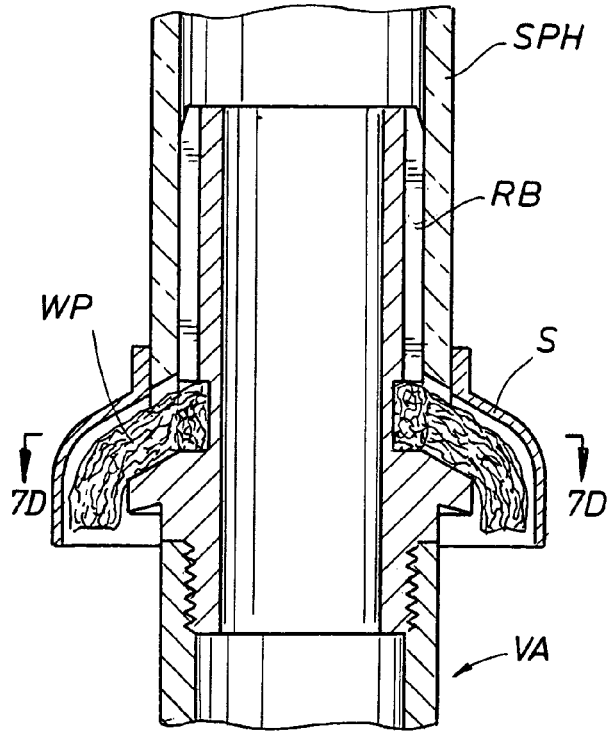
Figure 7D:
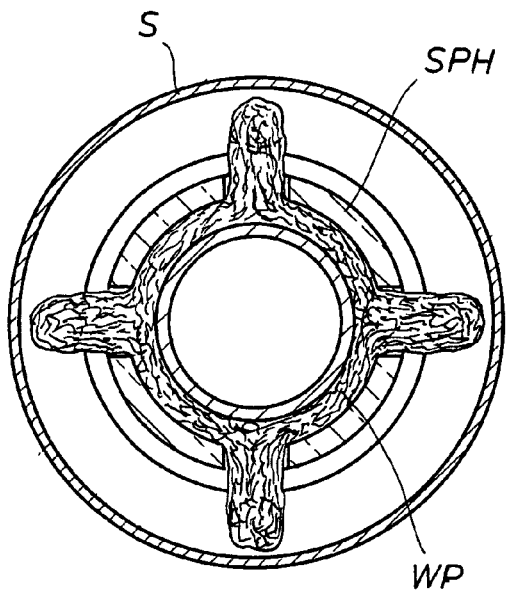

FIG. 5B illustrates an alternate stem protector base SPB that exhibits a slighted flanged and downwardly directed outlet as opposed to a bowl outlet. Stem protector base SPB provides a tight press fit with stem protector SP by means of ribs RB, providing drainage slots between the ribs. FIG. 5D illustrates a stem protector fitting SPF that could be designed to mate, at its top, into standard stem protector assemblies while, in its bottom, with a particular valve actuator opening.

FIG. 6 illustrates further alternate condensation guides referred to as drain structures D. Analogous to the embodiment of FIG. 4C, drain structures D are provided that could fit inside of (existing) stem protector housings SP. Drainage holes DH are provided in lower portions of stem protector SP proximate the drain structure. Condensation runs down the inside of the stem protector, is trapped by drain D, and drains out of drainage holes DH. An outside drainage guide DG or fitting could be provided to further direct the water on the outside of the stem protector assembly. Drain D could be of various shapes and various dimensions as illustrated in the embodiments of FIG. 6. Drainage holes DH could be of various shapes and dimensions as illustrated in the embodiments of FIG. 6. The stem protector of FIG. 6 with its drainage structure D and drain holes DH could be designed to fit on top of valve actuator structure VA.

FIG. 7 illustrates a further alternate embodiment of a draining stem protector assembly and valve actuator combination. In the embodiment of FIG. 7 a wicking washer WD or wicking portion WP is provided between, for instance, a stem protector housing SP and valve actuator VA. The wicking washer WD or wicking portion WP can be provided with sufficient structure to capture condensation as it runs down the inside of stem protector housing SP. The wicking washer or wicking portion would wick the captured condensation to the outside of the assembly. As illustrated in FIG. 7 the outside of the wicking washer, formed of suitable wicking material or fibers or tubes, could be protected by a shield S and could have outside extensions under the shield that help drain or wick water to the outside of the assembly such that it drains by gravity or moves by evaporation away from the inside of the stem protector housing SPH.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A condensation draining system for valve stem protectors, comprising:
    a stem protector assembly structured to mate with an actuator structured to actuate a commercial valve having a stem;
    the assembly providing a housing for encompassing the stem; and
    wherein the assembly is structured in combination with the actuator to provide at least one condensation collection structure for directing interior stem cover housing condensation to drain at least one opening in a lower portion of, or at the bottom of, the actuator/assembly combination, for substantially draining condensation from inside the actuator/assembly combination to outside the actuator/assembly combination.

2. The system of claim 1 wherein the assembly includes a fitting that mates between the actuator and the stem protector assembly.

3. The system of claim 1 wherein the assembly includes a base with ribs and a stem housing that press-fits over the ribs.

4. The system of claim 3 wherein the assembly includes a slot between the ribs that communicates with the opening below or in the stem housing for communicating drained condensation.

5. The system of claim 3 wherein the base includes a flanged structure extending below and outward from the stem housing.

6. The system of claim 5 wherein the flanged structure includes a provision for at least one flange drain hole.

7. The system of claim 1 wherein the stem housing comprises a cylindrical sleeve.

8. The system of claim 1 wherein the condensation collection structure includes a wicking material attached within the stem housing, the wicking material structured to drain housing condensation to and through the opening.

9. The system of claim 1 wherein the at least one opening includes at least one port through the housing wall and the assembly includes an annular structure affixed to the interior housing wall proximate the port.

10. A method for draining condensation from inside to outside a valve actuator/stem protector assembly combination, comprising:
    mating a stem protector assembly with a valve actuator, the actuator structured to actuate a commercial valve having a stem;
    providing condensation collecting structure within the mated actuator/assembly combination for directing stem cover interior housing condensation to drain to at least one opening of the actuator/assembly combination; and
    draining interior stem cover housing condensation from inside to outside the actuator/assembly combination through the opening.

11. The method of claim 10 wherein mating the valve actuator with the stem protector assembly includes attaching a fitting/base to a valve actuator proximate a junction of the actuator with the valve stem and press fitting a stem housing over ribs provided by the fitting/base.

12. The method of claim 10 that includes employing a wicking material to drain condensation from inside to outside the actuator/assembly combination.

13. The method of claim 10 that includes porting drained concentration from inside to outside the actuator/assembly combination and to a side of the actuator.

* * * * *